United States Patent
Fujishita et al.

(10) Patent No.: US 12,552,465 B2
(45) Date of Patent: Feb. 17, 2026

(54) PLATE MEMBER JOINT STRUCTURE AND MANUFACTURING METHOD

(71) Applicant: HONDA MOTOR CO., LTD., Tokyo (JP)

(72) Inventors: Kimitoshi Fujishita, Saitama (JP); Hiroyuki Watanabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 18/525,297

(22) Filed: Nov. 30, 2023

(65) Prior Publication Data
US 2024/0182120 A1 Jun. 6, 2024

(30) Foreign Application Priority Data
Dec. 2, 2022 (JP) .................................. 2022-193761

(51) Int. Cl.
*B62D 27/02* (2006.01)
*B62D 25/02* (2006.01)

(52) U.S. Cl.
CPC .......... *B62D 27/023* (2013.01); *B62D 25/025* (2013.01)

(58) Field of Classification Search
CPC ........ B62D 27/023; B62D 25/025; E04C 5/01
USPC ........................................................... 52/843
See application file for complete search history.

(56) References Cited

U.S. PATENT DOCUMENTS

| | | | | |
|---|---|---|---|---|
| 4,194,763 | A * | 3/1980 | Reidelbach | B62D 21/00 296/187.03 |
| 6,360,510 | B1 * | 3/2002 | Woodrum | E04C 3/32 52/36.2 |
| 7,070,228 | B2 * | 7/2006 | Shimizu | B60R 19/18 296/193.06 |
| 7,407,219 | B2 * | 8/2008 | Glasgow | B60R 19/18 293/133 |

(Continued)

FOREIGN PATENT DOCUMENTS

| | | |
|---|---|---|
| JP | 2002-361459 A | 12/2002 |
| JP | 2006-192926 A | 7/2006 |

(Continued)

OTHER PUBLICATIONS

Sep. 9, 2025, Translation of Japanese Office Action issued for related JP Application No. 2022-193761.

*Primary Examiner* — Beth A Stephan
(74) *Attorney, Agent, or Firm* — Paratus Law Group, PLLC

(57) ABSTRACT

A plate member joint structure formed in a tubular shape includes: a first plate member including a pair of flange portions and having a hat-shaped cross section; and a second plate member in contact with and joined to the pair of flange portions of the first plate member, wherein each of the pair of flange portions of the first plate member has a first surface in contact with the second plate member and a second surface opposite to the first surface, the second surface of each of the flange portions is integrally provided with a reinforcing portion protruding opposite to the second plate member, and the reinforcing portion has a closed cross-sectional space. The closed cross-sectional space has a closed cross section when viewed in a direction orthogonal to a longitudinal direction and a plate thickness direction of the flange portions.

10 Claims, 7 Drawing Sheets

(56) References Cited

U.S. PATENT DOCUMENTS

| | | | | |
|---|---|---|---|---|
| 8,235,458 B2* | 8/2012 | Mori | ................ | B62D 25/2036 |
| | | | | 296/193.06 |
| 8,857,894 B2* | 10/2014 | Grall | .................... | B60R 19/34 |
| | | | | 293/133 |
| 9,126,551 B2* | 9/2015 | Impero | .................... | F16F 7/12 |
| 9,162,707 B2* | 10/2015 | Eipper | .................. | B62D 25/04 |
| 9,764,766 B2* | 9/2017 | Yoshida | .............. | B62D 21/157 |
| 11,008,044 B2* | 5/2021 | Fukushi | ................ | B62D 25/02 |
| 11,400,800 B2* | 8/2022 | Otsuka | .................... | E04C 5/06 |
| 12,065,195 B2* | 8/2024 | Kawachi | .................. | F16B 5/08 |
| 2009/0026777 A1* | 1/2009 | Schmid | .................. | B60R 19/34 |
| | | | | 293/133 |
| 2014/0147693 A1* | 5/2014 | Yasuyama | ............... | B32B 3/00 |
| | | | | 428/603 |
| 2015/0360725 A1 | 12/2015 | Yoshida | | |

FOREIGN PATENT DOCUMENTS

| | | | | | |
|---|---|---|---|---|---|
| JP | 2006-290154 A | | 10/2006 | | |
| JP | 2008-284987 A | | 11/2008 | | |
| JP | 2010064549 A | * | 3/2010 | ............ | B62D 25/15 |
| JP | 2012206704 A | * | 10/2012 | ............ | B62D 25/20 |
| JP | 2016-002817 A | | 1/2016 | | |
| JP | 2019-156046 A | | 9/2019 | | |

* cited by examiner

PLATE MEMBER JOINT STRUCTURE AND MANUFACTURING METHOD

CROSS-REFERENCE TO RELATED APPLICATIONS

This application is based on and claims priority under 35 USC 119 from Japanese Patent Application No. 2022-193761 filed on Dec. 2, 2022, the contents of which are incorporated herein by reference.

TECHNICAL FIELD

The present invention relates to a plate member joint structure and a manufacturing method.

BACKGROUND ART

In recent years, active efforts have been made to provide access to a sustainable transportation system in consideration of vulnerable people such as the elderly, people with disability and children among traffic participants.

To achieve this purpose, focus has been placed on research and development on further improving safety and convenience of traffic by development related to vehicle body rigidity.

For example, JP2008-284987A discloses a structure in a vehicle body, in which a floor member, and a flange portion of a reinforcement member are jointed by welding. The flange portion of the reinforcing member is provided with a protruding portion on a distal end surface, and a welding area to the reinforcing member is sufficiently ensured and the welding strength is improved. To enable spot welding while improving the strength and rigidity of the floor member by setting the reinforcing member at an appropriate wall thickness relative to the floor member having a small thickness, a welded portion of the reinforcing member has a small thickness.

JP2006-290154A discloses a structure in which a rear end portion of a front side frame and a front end portion of a floor frame of an automobile are joined by spot welding. In JP2006-290154A, a stiffener (reinforcing member) defining a closed cross section between the stiffener and the floor frame is provided. The stiffener added as a separate component includes a flange portion, and the stiffener, the floor frame, and the front side frame are joined by overlapping and spot-welding three plate members including the flange portion of the stiffener, a flange portion of the floor frame, and a flange portion of the front side frame. In JP2006-290154A, spot welding in which four plate members (front side frame, floor frame, stiffener, floor panel) are overlapped is avoided to ensure sufficient welding strength.

SUMMARY

In JP2008-284987A, although the welded portion of the reinforcing member has a small thickness, the plate thickness of the welded portion of the reinforcing member is, when compared with a plate thickness of the floor member, set to be substantially three times the plate thickness of the floor member that is a welding target. To further improve the quality of welding, it is desirable to further reduce a difference in plate thickness between the welded portion of the reinforcing member and the floor member.

However, it is difficult to further reduce the plate thickness of the welded portion of the reinforcing member since the reinforcing member is processed by press molding. That is, the reinforcing member including the welded portion has a certain plate thickness depending on the limit of the manufacturing method, and the setting of the plate thickness is limited.

The joint structure of JP2006-290154A is provided with a stiffener. Since the stiffener is provided, it is not necessary to further provide a plate member to improve the strength of the frame.

However, the number of components increases by providing the stiffener itself as a separate component.

In a plate member joint structure, various structures for improving the rigidity and strength are proposed, and there is room for improvement from the viewpoint of, for example, limiting the plate thickness and increasing the number of components described above.

An aspect of the present disclosure relates to provide a plate member joint structure and a manufacturing method that can provide a degree of freedom in plate thickness setting and prevent an increase in the number of components while ensuring sufficient rigidity and strength.

According to the present invention, it is possible to provide a degree of freedom in plate thickness setting and prevent an increase in the number of components while ensuring sufficient strength.

BRIEF DESCRIPTION OF DRAWINGS

An exemplary embodiment of the present invention will be described in detail based on the following figures, wherein.

DESCRIPTION OF EMBODIMENTS

Hereinafter, an embodiment of a plate member joint structure and a manufacturing method of the present invention will be described with reference to the accompanying drawings.

Plate Member Joint Structure

Figure 1:
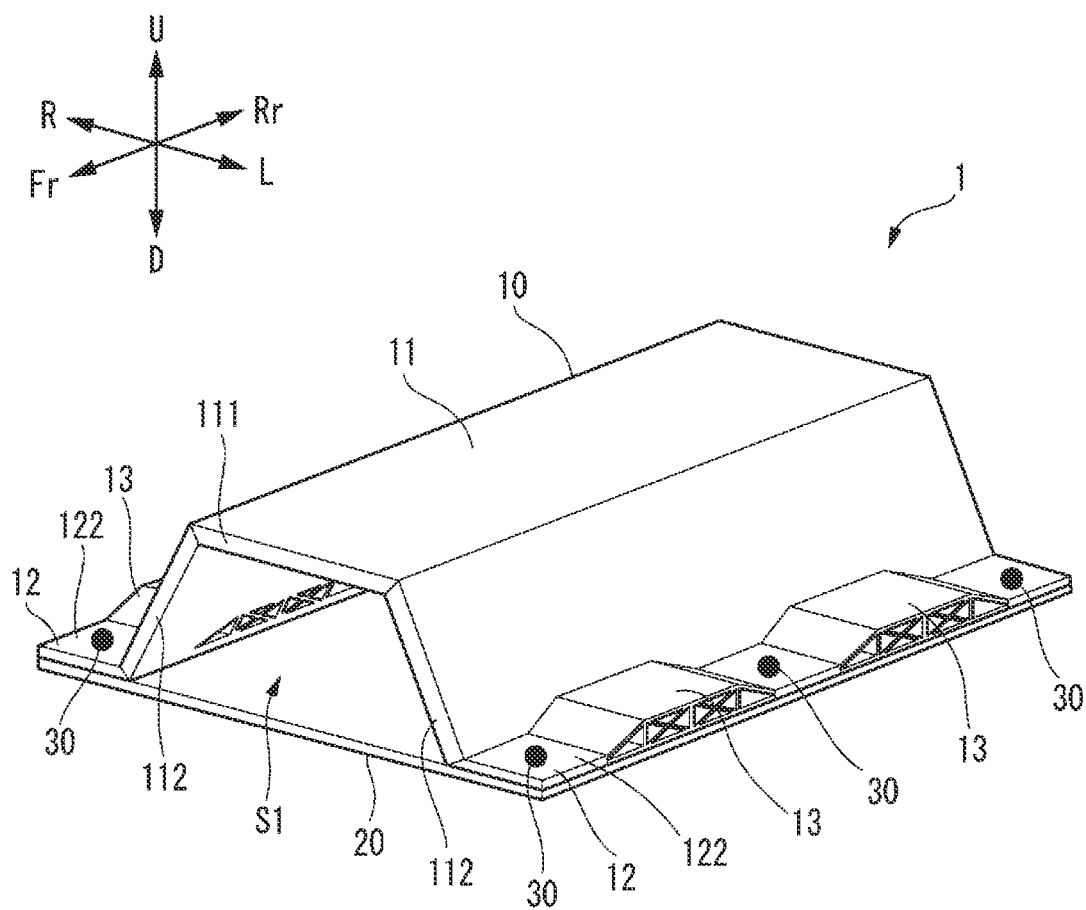
FIG. 1 is a perspective view of a plate member joint structure 1 according to an embodiment of the present invention, in which joint portions 30 are formed by spot welding.
Figure 2:
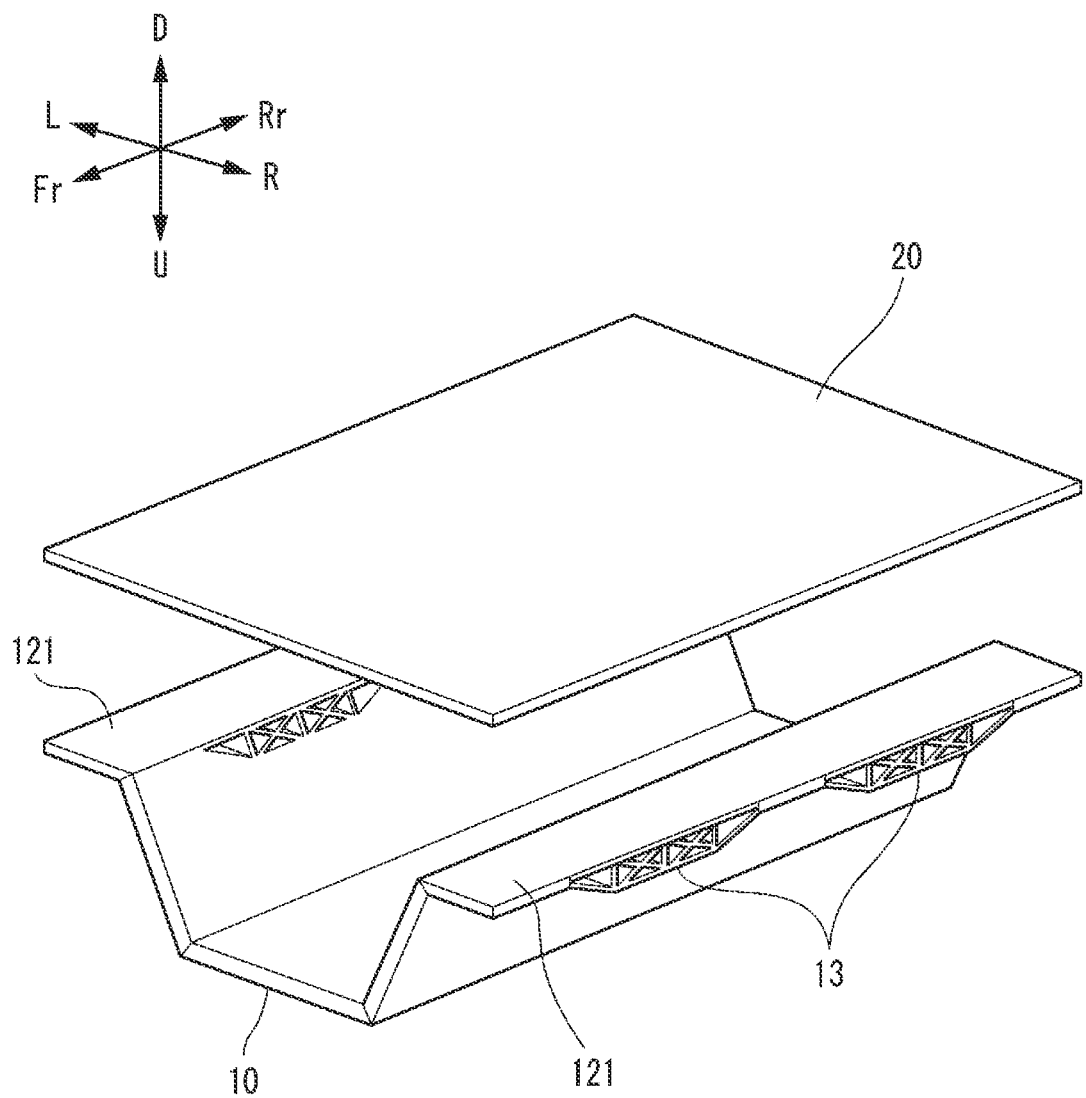
FIG. 2 is an exploded perspective view of the plate member joint structure 1 when viewed from below.

As shown in FIGS. 1 and 2, a plate member joint structure 1 includes a first plate member 10 and a second plate member 20, and has the first plate member 10 and the second plate member 20 joined into a tubular shape. The plate member joint structure 1 is, for example, a pillar or a side sill provided in an automobile. However, the plate member joint structure 1 is not limited thereto, and can be applied to various applications as long as the plate member joint structure 1 includes at least two plate members joined into a tubular shape, and is not limited to a component provided in an automobile. For convenience of description, an extending direction of the tubular shape is defined as a front-rear direction, a direction in which the first plate member 10 and the second plate member 20 overlap each other (plate thickness direction) is defined as an up-down direction, and a direction orthogonal to the front-rear direction and the up-down direction is defined as a left-right direction.

The first plate member 10 has a hat-shaped cross section when viewed in the front-rear direction. Specifically, the first plate member 10 includes a recessed portion 11 and a pair of flange portions 12 provided at the recessed portion 11. In the present embodiment, the recessed portion 11 includes a top plate portion 111 and a pair of vertical wall portions 112 inclined at both ends of the top plate portion 111 in the left-right direction. The pair of flange portions 12 are connected to the pair of vertical wall portions 112.

Each of the pair of flange portions 12 has a lower surface 121 and an upper surface 122 opposite to the lower surface 121. The second plate member 20 is in contact with the lower surface 121.

The second plate member 20 has a flat plate shape. The second plate member 20 is thinner than the first plate member 10. The second plate member 20 is in contact with and joined to the pair of flange portions 12 of the first plate member 10. The pair of flange portions 12 are integrally provided with reinforcing portions 13, and joint portions 30 between the first plate member 10 and the second plate member 20 are provided on the pair of flange portions 12 in positions different from the reinforcing portions 13. Details of the reinforcing portion 13 will be described later.

The first plate member 10 at the joint portion 30 has a plate thickness smaller than plate thicknesses of other portions of the first plate member 10, that is, the plate thickness of the recessed portion 11 and the plate thickness of the reinforcing portion 13 (a distance between the lower surface 121 and the upper surface 122 at the reinforcing portion 13). The plate thickness of the first plate member 10 at the joint portion 30 is substantially the same as a plate thickness of the second plate member 20.

The joint portion 30 is formed by welding the first plate member 10 and the second plate member 20, for example. Examples of a welding mode include spot welding, arc welding, and laser welding. The spot welding is performed on a surface on which the first plate member 10 and the second plate member 20 are overlapped as indicated by black circles in FIG. 1, and the arc welding or the laser welding is performed on outer edge portions of the first plate member 10 and the second plate member 20 as indicated by thick solid lines in FIG. 3.

When the first plate member 10 having a hat-shaped cross section and the second plate member 20 having a flat plate shape are joined, an internal space S1 surrounded by the first plate member 10 and the second plate member 20 is defined. That is, the plate member joint structure 1 is formed in a tubular shape having the internal space S1. The cross section of the plate member joint structure 1 has a trapezoidal shape when viewed in the front-rear direction.

Next, details of the reinforcing portion 13 will be described with reference to FIG. 4. Hereinafter, the pair of flange portions 12 are simply referred to as the flange portions 12. The front-rear direction is also referred to as a longitudinal direction of the plate member joint structure 1 or a longitudinal direction of the flange portion 12.

The reinforcing portion 13 is a protruding portion that is integrally provided on the upper surface 122 of the flange portion 12 and protrudes opposite to the second plate member 20. A protruding surface of the reinforcing portion 13 constitutes a portion of the upper surface 122 of the flange portion 12.

Figure 3:
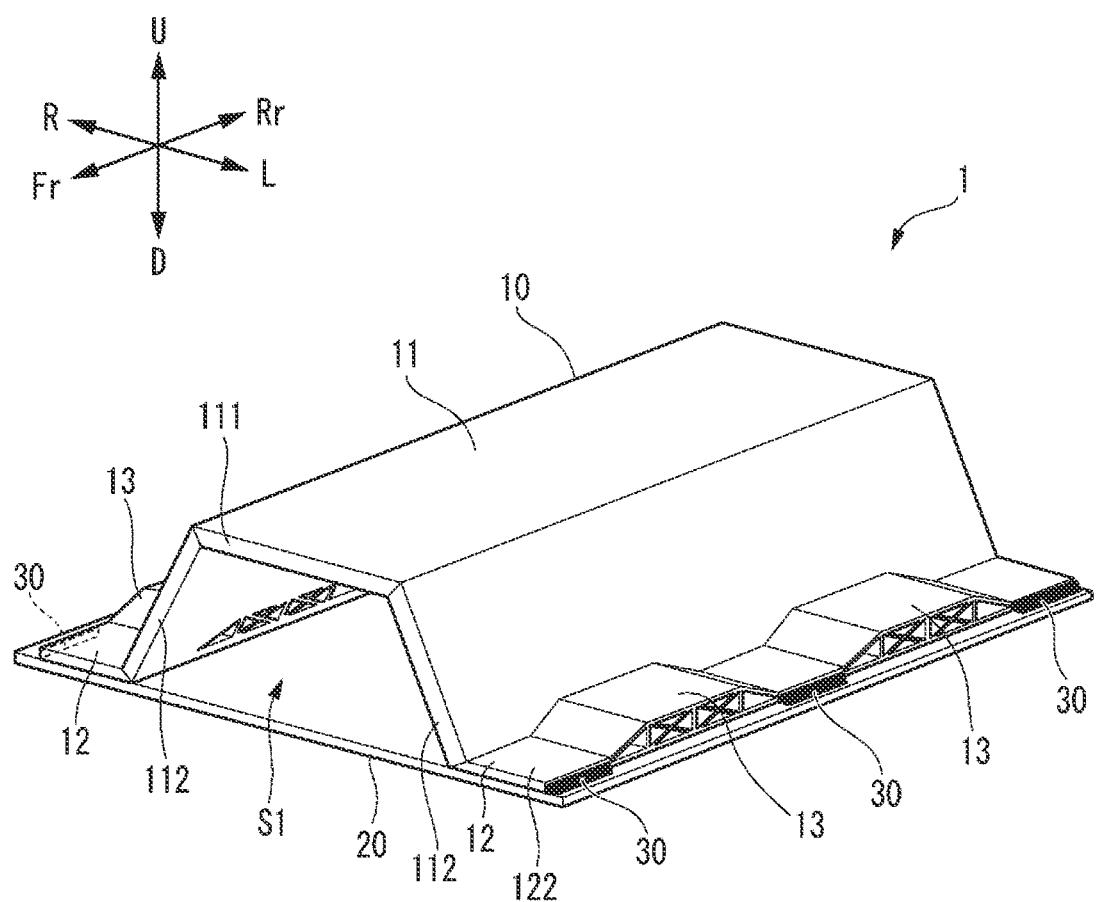
FIG. 3 is a perspective view of the plate member joint structure 1, in which the joint portions 30 are formed by arc welding or laser welding.

The reinforcing portion 13 protrudes in a trapezoidal shape when viewed in a direction (that is, the left-right direction) orthogonal to the longitudinal direction and the plate thickness direction of the flange portion 12. As shown in FIGS. 1 and 3, the reinforcing portion 13 extends in the left-right direction from the vertical wall portion 112 of the recessed portion 11 to a distal end of the flange portion 12, and has substantially the same length as a length of the flange portion 12 in the left-right direction.

As described above, the reinforcing portion 13 is provided in a position different from the joint portion 30 between the first plate member 10 and the second plate member 20. That is, at the reinforcing portion 13, the first plate member 10 and the second plate member 20 are in contact but are not joined.

Figure 4:
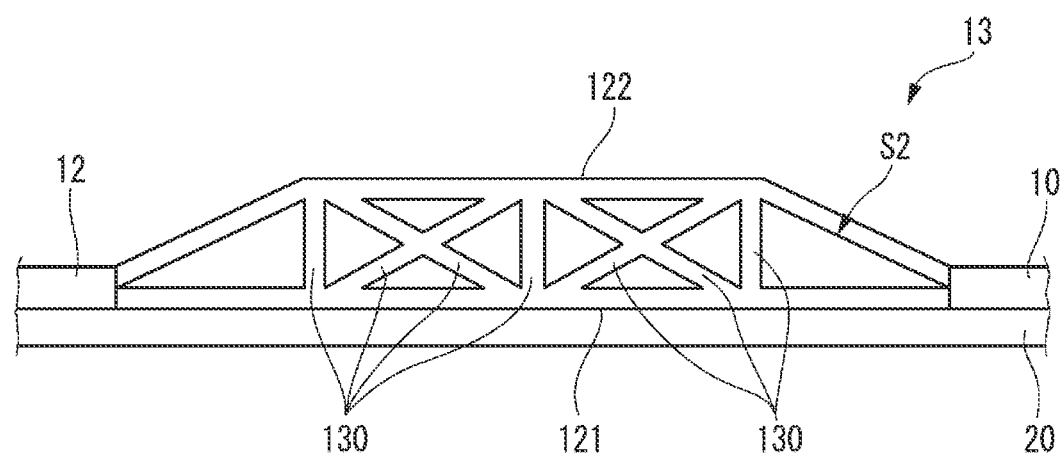
FIG. 4 shows a reinforcing portion 13 as viewed from a left-right direction.

As shown in FIG. 4, the reinforcing portion 13 has a closed cross-sectional space S2 that is defined between the lower surface 121 and the upper surface 122 of the first plate member 10 and has a closed cross section when viewed in the direction (that is, the left-right direction) orthogonal to the longitudinal direction and the plate thickness direction of the flange portion 12. In the closed cross-sectional space S2 are provided with a plurality of wall portions 130 to be described later, and the closed cross section of the closed cross-sectional space S2 has a geometric shape (truss structure) when viewed in the left-right direction. The closed cross-sectional space S2 runs in the left-right direction and communicates with the internal space S1 of the plate member joint structure 1 (see FIGS. 1 to 3).

The plate member joint structure 1 has higher rigidity due to the reinforcing portion 13 having the above-described configuration. More specifically, the reinforcing portion 13 improves the bending rigidity of the plate member joint structure 1. For example, when a rear end portion of the plate member joint structure 1 is fixed and a predetermined load is applied upward to a front end central portion of the first plate member 10, an upward displacement of the plate member joint structure 1 is smaller as compared with a case in which no reinforcing portion 13 is provided. The reinforcing portion 13 further improves the strength of the plate member joint structure 1.

As described above, the first plate member 10 is integrally provided with the reinforcing portion 13 protruding opposite to the second plate member 20 in a position different from the joint portion 30 between the first plate member 10 and the second plate member 20. The reinforcing portion 13 has the closed cross-sectional space S2. The reinforcing portion 13 having the closed cross-sectional space S2 can improve the rigidity and strength of the plate member joint structure 1.

Since the reinforcing portion 13 is provided integrally with the first plate member 10, an increase in the number of components can be prevented as compared with a case in which the reinforcing portion is provided separately from the first plate member.

In the present embodiment, to further improve the rigidity and strength of the plate member joint structure 1, a plurality of reinforcing portions 13 are provided on the upper surface 122 of each flange portion 12 along the longitudinal direction. The adjacent reinforcing portions 13 are provided at a predetermined interval.

Further, a plurality of joint portions 30 are provided along the longitudinal direction of each flange portion 12, and the plurality of reinforcing portions 13 and the plurality of joint portions 30 are alternately provided along the longitudinal direction. Here, the joint portions 30 are provided at a front end portion and a rear end portion of each flange portion 12 in the longitudinal direction. Since the plurality of joint portions 30 are provided along the longitudinal direction, the joining between the first plate member 10 and the second plate member 20 is strong. Since the plurality of reinforcing portions 13 and the plurality of joint portions 30 are alternately provided along the longitudinal direction, the rigidity and strength of the plate member joint structure 1 can be further improved.

Further, in the closed cross-sectional space S2 are provided with the plurality of wall portions 130 that divide the closed cross-sectional space S2 into a plurality of portions. The wall portions 130 are provided vertically or obliquely from a lower portion to an upper portion of the closed cross-sectional space S2. When viewed in the left-right direction, each space defined by being divided by the plurality of wall portions 130 has a triangular shape. The plurality of wall portions 130 function as a stiffener for further improving the rigidity and strength of the closed cross-sectional space S2. In the present embodiment, although the plurality of wall portions 130 are provided, the present invention is not limited thereto. For example, only one wall portion 130 that divides the closed cross-sectional space S2 into two may be provided.

Plate Thickness at Joint Portions

Next, plate thicknesses of the first plate member 10 and the second plate member 20 at the joint portion 30 will be described.

When no reinforcing portion 13 is provided, generally at least one (for example, the first plate member) of the two plate members at the joint portion has a large thickness to improve the rigidity and strength of the plate member joint structure.

In the present embodiment, the plate member joint structure 1 has sufficient rigidity and strength due to the reinforcing portion 13. Therefore, the first plate member 10 at the joint portion 30 does not necessarily have a large thickness. In other words, the reinforcing portion 13 can provide a degree of freedom in setting the plate thickness of the joint portion 30. For example, the first plate member 10 at the joint portion 30 can have a small thickness, which leads to weight reduction.

When the joint portion 30 is formed by welding, the first plate member 10 and the second plate member 20 at the joint portion 30 preferably have a plate thickness ratio of 1:1 to improve welding quality. This is because, when there is a difference in plate thickness, the welded portion is not uniform or welding is not stable. For example, when the first plate member 10 has a large plate thickness from the viewpoint of rigidity and strength as in the related art, it is necessary for the second plate member 20 to have a large plate thickness to improve the welding quality, which increases the weight of the plate members. In contrast, in the plate member joint structure 1 as described above, there is a degree of freedom in setting the plate thickness at the joint portion 30. Accordingly, the welding quality can be improved by setting the plate thicknesses of the first plate member 10 and the second plate member 20 to be substantially the same and setting the plate thickness ratio at 1:1. That is, by welding the second plate member 20 having a small thickness to the first plate member 10 having the same small thickness at the joint portion 30, both improvement in welding quality and weight reduction can be achieved.

Manufacturing of First Plate Member

The first plate member 10 according to the present embodiment is integrally formed by, for example, additive manufacturing technology (hereinafter also referred to as AM technology) that can manufacture a component having a complicated three-dimensional shape by stacking and solidifying metal powder materials on a one layer basis. Accordingly, it is possible to manufacture a component having a fine and complicated three-dimensional shape which is difficult to manufacture by a manufacturing method in the related art such as machining and casting.

The closed cross-sectional space S2 of the first plate member 10 may have a fine structure since it is provided between the lower surface 121 and the upper surface 122 of the flange portion 12, and the first plate member 10 having the closed cross-sectional space S2 can be integrally manufactured by the AM technology. The plurality of wall portions 130 provided in the closed cross-sectional space S2 may also have a fine and complicated three-dimensional shape, and the first plate member 10 including the plurality of wall portions 130 can be integrally manufactured by the AM technology.

By the AM technology, the plate thickness of the first plate member 10 at the joint portion 30 can be easily made smaller than the plate thicknesses of other portions (the recessed portion 11 and the reinforcing portion 13). Accordingly, it is possible to set the plate thickness of the first plate member 10 at the joint portion 30 in consideration of the rigidity and strength actually required for the plate member joint structure 1 and the plate thickness of the second plate member 20.

After the first plate member 10 is manufactured by the AM technology, metal powder remaining instead of being solidified may adhere to the closed cross-sectional space S2. When the closed cross-sectional space S2 runs in the left-right direction, the metal powder adhering to the closed cross-sectional space S2 is easily removed by, for example, blowing high-pressure air into the closed cross-sectional space S2.

[First Modification]

Figure 5:
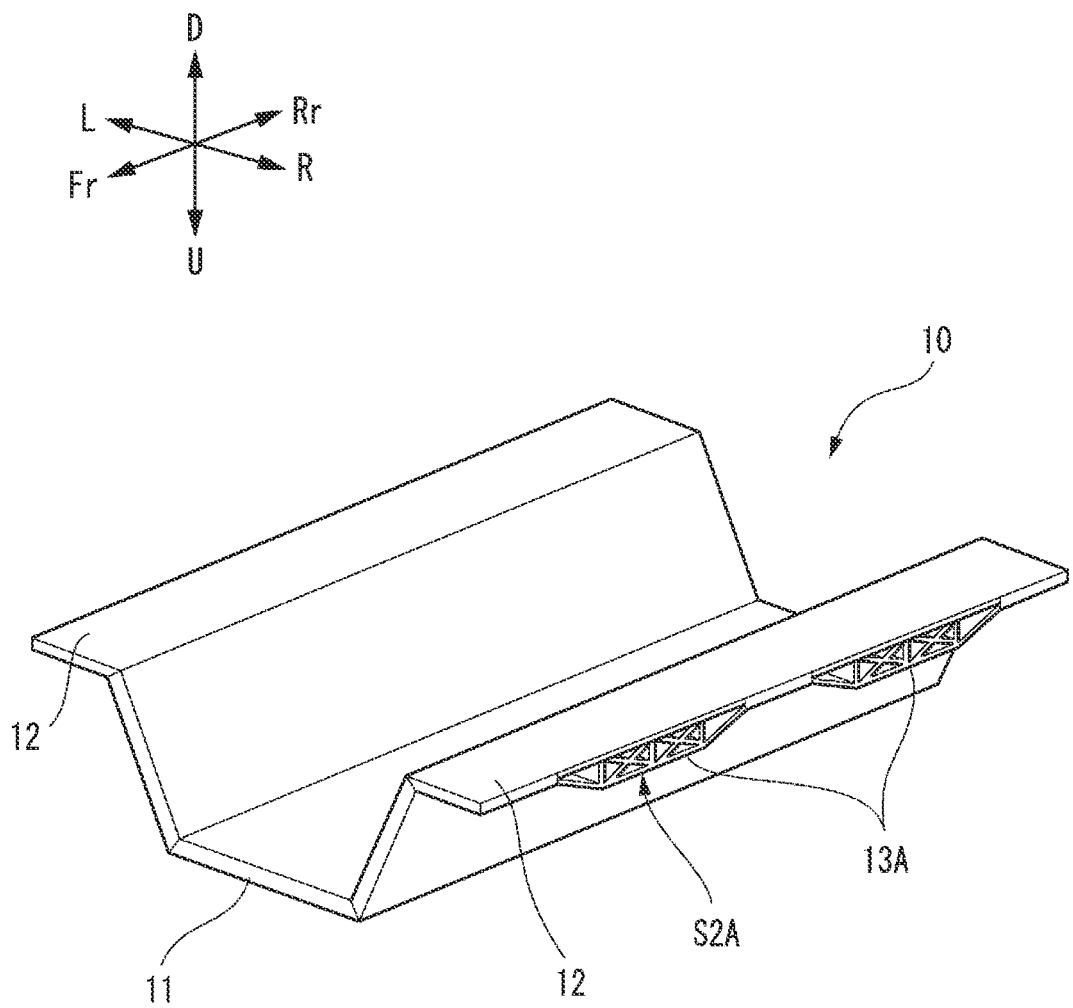
FIG. 5 is a perspective view of a first plate member 10 provided with reinforcing portions 13A according to a first modification.

In a first modification as shown in FIG. 5, a closed cross-sectional space S2A of a reinforcing portion 13A provided in the first plate member 10 does not run in the left-right direction. Specifically, the closed cross-sectional space S2A does not communicate with the internal space S1 of the plate member joint structure 1. Even with such a configuration of the reinforcing portion 13A, the rigidity and strength of the plate member joint structure 1 can be improved.

[Second Modification]

Figure 6:
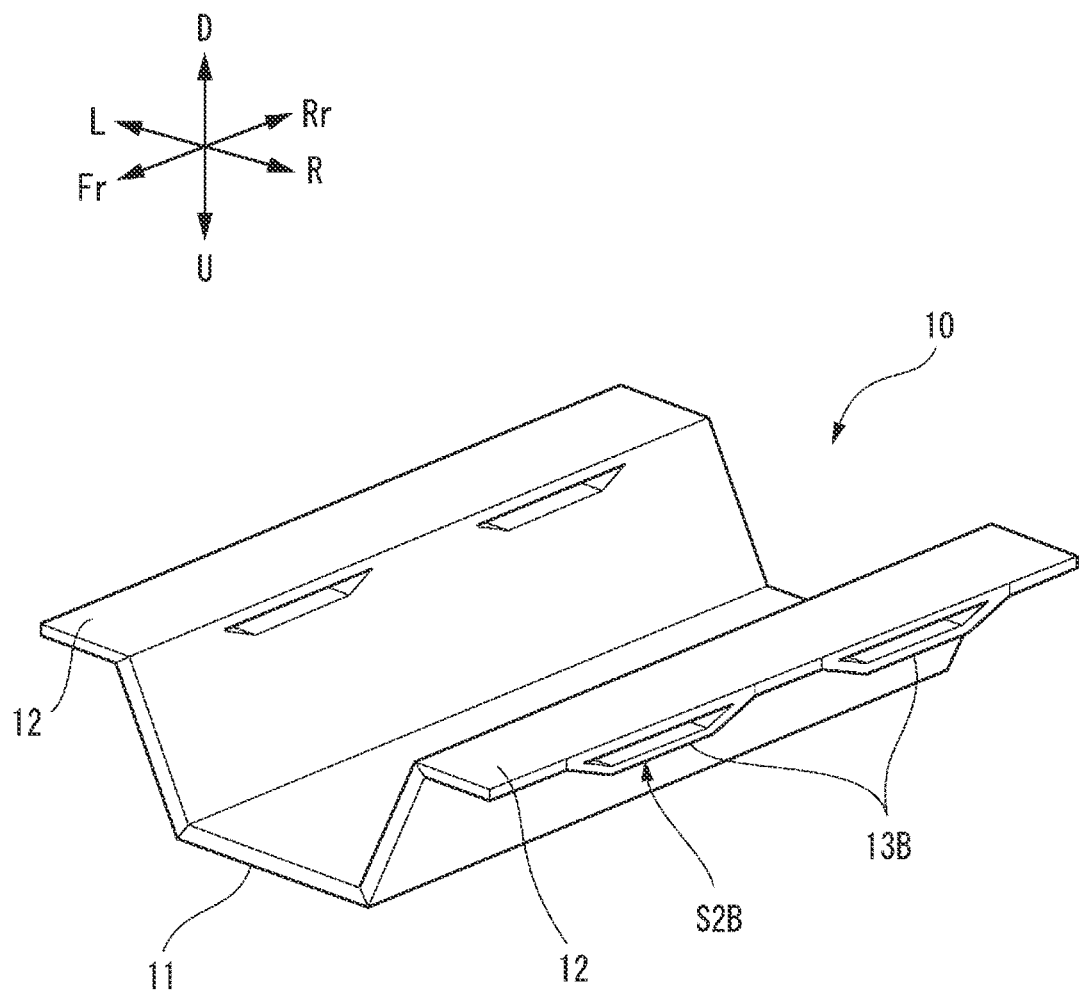
FIG. 6 is a perspective view of the first plate member 10 provided with reinforcing portions 13B according to a second modification.

In a second modification as shown in FIG. 6, no wall portion 130 is provided in a closed cross-sectional space S2B of a reinforcing portion 13B provided in the first plate member 10. Even with such a configuration of the reinforcing portion 13B, the rigidity and strength of the plate member joint structure 1 can be improved.

[Third Modification]

Figure 7:
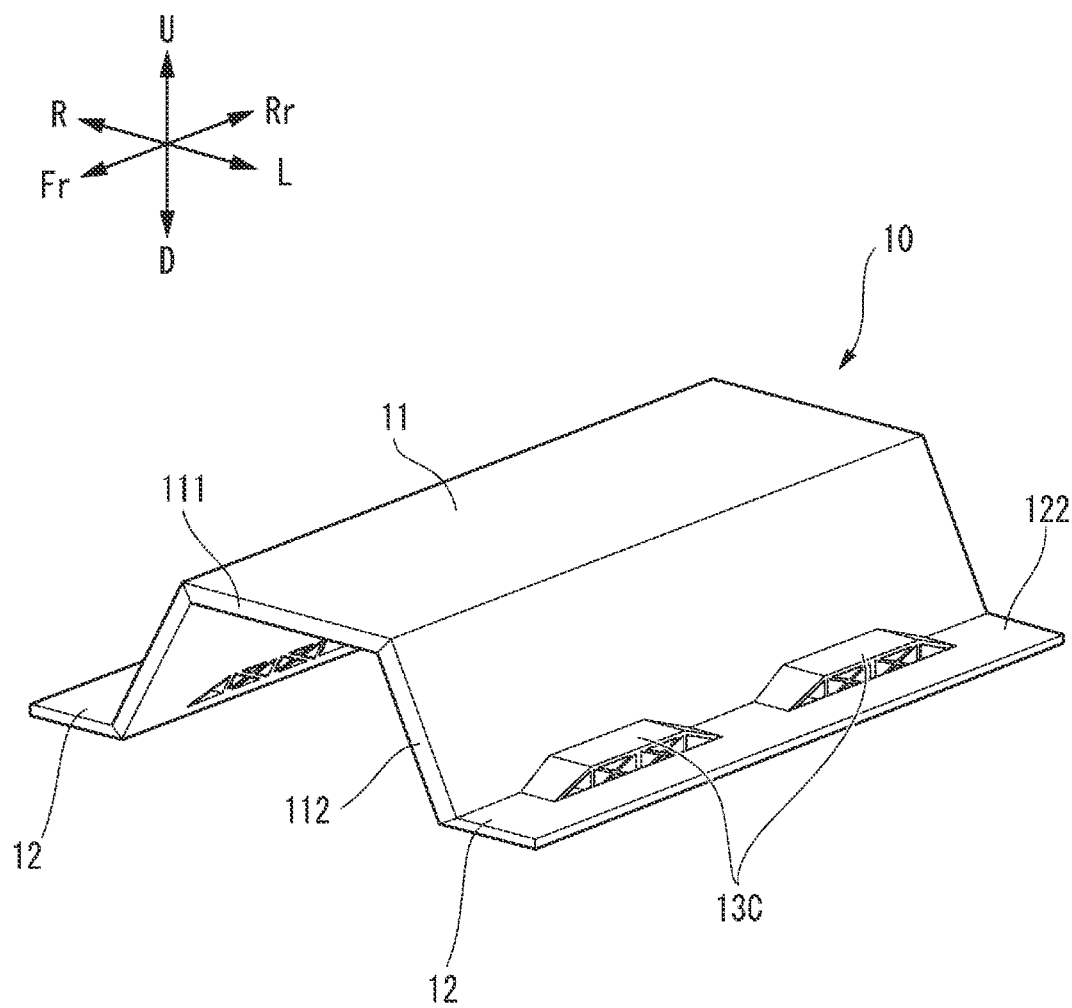
FIG. 7 is a perspective view of the first plate member 10 provided with reinforcing portions 13C according to a third modification.

In a third modification as shown in FIG. 7, reinforcing portions 13C provided in the first plate member 10 extend in the left-right direction from the vertical wall portion 112 of the recessed portion 11 to a central portion of the flange portion 12. Even with such a configuration of the reinforcing portion 13C, the rigidity and strength of the plate member joint structure 1 can be improved.

In the third modification, when the joint portion 30 is formed by arc welding or laser welding, the joint portion 30 can be formed over an entire outer edge portion of the flange portion 12 in the longitudinal direction.

Although an embodiment of the present invention has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, components in the above embodiment may be freely combined without departing from the gist of the invention.

For example, in the above-described embodiment, the cross section of the plate member joint structure 1 has a trapezoidal shape when viewed in the longitudinal direction (the front-rear direction) of the plate member joint structure 1. Alternatively, the present invention is not limited thereto and the plate member joint structure 1 can have a freely selected shape. For example, the cross section of the plate member joint structure 1 may have a semicircular shape, a semi-elliptical shape, a rectangular shape, a substantially U shape, or a substantially V shape. In this case, the recessed portion 11 of the first plate member 10 is formed in this shape.

The second plate member 20 may not have a flat plate shape. For example, the second plate member 20 may have a recessed portion and a pair of flange portions as in the first plate member 10.

The joint portion 30 is not limited to being formed by welding, and may be formed by, for example, mechanical fastening such as a self-piercing rivet. In the embodiment described above, since the setting of the plate thickness of the joint portion 30 can be made to have a degree of freedom, a plate thickness suitable for fastening by the self-piercing rivet can be set.

The joint portion 30 may be formed by a brazing filler metal or an adhesive. For example, the joint portion 30 may be formed by applying a paste brazing filler metal to a portion of a contact surface between the first plate member 10 and the second plate member 20 and heating the brazing filler metal, or may be formed by applying an adhesive to a portion of the contact surface.

In the present specification, at least the following matters are described. In parentheses, corresponding components and the like in the above-described embodiment are shown as an example, and the present invention is not limited thereto.

(1) A plate member joint structure (plate member joint structure 1) formed in a tubular shape, the plate member joint structure including:
 a first plate member (first plate member 10) including a pair of flange portions (a pair of flange portions 12) and having a hat-shaped cross section; and
 a second plate member (second plate member 20) in contact with and joined to the pair of flange portions of the first plate member, wherein
 each of the pair of flange portions of the first plate member has a first surface (lower surface 121) in contact with the second plate member and a second surface (upper surface 122) opposite to the first surface,
 the second surface of each of the flange portions is integrally provided with a reinforcing portion (reinforcing portion 13, 13A, 13B, 13C) protruding opposite to the second plate member in a position different from a joint portion (joint portion 30) between the first plate member and the second plate member, and
 the reinforcing portion has a closed cross-sectional space (closed cross-sectional space S2, S2A, S2B) defined between the first surface and the second surface of the first plate member, and the closed cross-sectional space has a closed cross section when viewed in a direction (left-right direction) orthogonal to a longitudinal direction and a plate thickness direction of the flange portions.

According to (1), the first plate member is integrally provided with the reinforcing portion protruding opposite to the second plate member in a position different from the joint portion between the first plate member and the second plate member. The reinforcing portion has the closed cross-sectional space. With such a configuration, the rigidity and strength of the plate member joint structure can be improved. Since the plate member joint structure has sufficient rigidity and strength at the reinforcing portion, a welded portion does not necessarily have a large plate thickness to improve the rigidity and strength, and it is possible to provide a degree of freedom in setting the plate thickness at the joint portion. Since the reinforcing portion is provided integrally with the first plate member, an increase in the number of components can be prevented as compared with a case in which the reinforcing portion is provided separately from the first plate member.

(2) The plate member joint structure according to (1), wherein
 the joint portion is formed by welding the first plate member and the second plate member, and
 the first plate member and the second plate member have substantially the same plate thickness at the joint portion.

According to (2), uniform and stable welding can be performed, and welding quality can be improved.

(3) The plate member joint structure according to (1) or (2), wherein
 a plurality of the reinforcing portions are provided on the second surface of each of the flange portions along the longitudinal direction.

According to (3), the rigidity and strength of the plate member joint structure can be further improved.

(4) The plate member joint structure according to (3), wherein
 each of the flange portions is provided with a plurality of the joint portions along the longitudinal direction, and
 the plurality of joint portions and the plurality of reinforcing portions are alternately provided along the longitudinal direction.

According to (4), since the plurality of joint portions are provided along the longitudinal direction, the joining between the first plate member and the second plate member is strong. Since the plurality of reinforcing portions and the plurality of joint portions are alternately provided along the longitudinal direction, the rigidity and strength of the plate member joint structure can be further increased.

(5) The plate member joint structure according to any one of (1) to (4), wherein
 the closed cross-sectional space of the reinforcing portion is provided with at least one wall portion (wall portion 130) that divides the closed cross-sectional space into a plurality of portions.

According to (5), the rigidity and strength of the closed cross-sectional space can be improved, and the rigidity and strength of the entire plate member joint structure can be further improved.

(6) The plate member joint structure according to any one of (1) to (5), wherein
 the first plate member is integrally formed by additive manufacturing.

According to (6), the first plate member provided with the reinforcing portion having the closed cross-sectional space can be integrally formed.

(7) The plate member joint structure according to (6), wherein
the hat-shaped cross section of the first plate member is implemented by a recessed portion (recessed portion 11) and the pair of flange portions provided at the recessed portion, and
the first plate member is formed such that the joint portion has a plate thickness smaller than a plate thickness of the recessed portion.

According to (7), it is possible to easily set the plate thickness of the first plate member at the joint portion by additive manufacturing in consideration of the rigidity and strength actually required for the plate member joint structure and the plate thickness of the second plate member.

(8) The plate member joint structure according to (6) or (7), wherein
the closed cross-sectional space of the reinforcing portion runs in the direction orthogonal to the longitudinal direction and the plate thickness direction of the flange portions.

After the first plate member is formed by additive manufacturing, the material used for additive manufacturing may adhere to the closed cross-sectional space. According to (8), the closed cross-sectional space runs in the direction orthogonal to the longitudinal direction and the plate thickness direction of the flange portion, and thus the material adhering to the closed cross-sectional space is easily removed.

(9) A method for manufacturing the first plate member used in the plate member joint structure according to any one of (1) to (5), the method including:
integrally forming the first plate member by additive manufacturing.

According to (9), the first plate member provided with the reinforcing portion having the closed cross-sectional space can be integrally formed.

(10) The manufacturing method according to (9), wherein the hat-shaped cross section of the first plate member is implemented by a recessed portion (recessed portion 11) and the pair of flange portions provided at the recessed portion, and
the first plate member is formed such that the joint portion has a plate thickness smaller than a plate thickness of the recessed portion.

According to (10), it is possible to easily set the plate thickness of the first plate member at the joint portion by additive manufacturing in consideration of the rigidity and strength actually required for the plate member joint structure and the plate thickness of the second plate member.

What is claimed is:

1. A plate member joint structure formed in a tubular shape, the plate member joint structure comprising:
a first plate member including a pair of flange portions and having a hat-shaped cross section; and
a second plate member in contact with and joined to the pair of flange portions of the first plate member, wherein
each of the pair of flange portions of the first plate member has a first surface in contact with the second plate member and a second surface opposite to the first surface,
the second surface of each of the flange portions is integrally provided with a reinforcing portion protruding opposite to the second plate member in a position different from a joint portion between the first plate member and the second plate member, and
the reinforcing portion has a closed cross-sectional space defined between the first surface and the second surface of the first plate member, and the closed cross-sectional space has a closed cross section when viewed in a direction orthogonal to a longitudinal direction and a plate thickness direction of the flange portions.

2. The plate member joint structure according to claim 1, wherein
the joint portion is formed by welding the first plate member and the second plate member, and
the first plate member and the second plate member have substantially the same plate thickness at the joint portion.

3. The plate member joint structure according to claim 1, wherein
a plurality of the reinforcing portions are provided on the second surface of each of the flange portions along the longitudinal direction.

4. The plate member joint structure according to claim 3, wherein
each of the flange portions is provided with a plurality of the joint portions along the longitudinal direction, and
the plurality of joint portions and the plurality of reinforcing portions are alternately provided along the longitudinal direction.

5. The plate member joint structure according to claim 1, wherein
the closed cross-sectional space of the reinforcing portion is provided with at least one wall portion that divides the closed cross-sectional space into a plurality of portions.

6. The plate member joint structure according to claim 1, wherein
the first plate member is integrally formed by additive manufacturing.

7. The plate member joint structure according to claim 6, wherein
the hat-shaped cross section of the first plate member is implemented by a recessed portion and the pair of flange portions provided at the recessed portion, and
the first plate member is formed such that the joint portion has a plate thickness smaller than a plate thickness of the recessed portion.

8. The plate member joint structure according to claim 6, wherein
the closed cross-sectional space of the reinforcing portion runs in the direction orthogonal to the longitudinal direction and the plate thickness direction of the flange portions.

9. A method for manufacturing the first plate member used in the plate member joint structure according to claim 1, the method comprising:
integrally forming the first plate member by additive manufacturing.

10. The manufacturing method according to claim 9, wherein
the hat-shaped cross section of the first plate member is implemented by a recessed portion and the pair of flange portions provided at the recessed portion, and
the first plate member is formed such that the joint portion has a plate thickness smaller than a plate thickness of the recessed portion.

* * * * *